No. 817,487. PATENTED APR. 10, 1906.
A. C. HUMMER.
BUTTER CUTTER.
APPLICATION FILED JAN. 26, 1906.

Fig.1  Fig.2

Witnesses
Edward W. Cressman.
Arlita Adams

Inventor
A. C. Hummer
By Adams & Brooks
Attorneys

UNITED STATES PATENT OFFICE.

ARTHUR C. HUMMER, OF SEATTLE, WASHINGTON.

BUTTER-CUTTER.

No. 817,487. Specification of Letters Patent. Patented April 10, 1906.

Application filed January 26, 1906. Serial No. 298,037.

*To all whom it may concern:*

Be it known that I, ARTHUR C. HUMMER, a citizen of the United States of America, and a resident of the city of Seattle, in the county of King and State of Washington, have invented certain new and useful Improvements in Butter-Cutters, of which the following is a specification.

My invention is especially related to improvements in implements for cutting butter, and has for its primary object to provide a simple and efficient device of this nature for cutting and removing from bodies of butter portions thereof of predetermined size.

With the above and other objects to be referred to in the following description in view, my invention resides in the construction, combination, and arrangement of parts as set forth in the following specification and succinctly pointed out in the appended claims.

In the accompanying drawings, forming a part of this specification, and in which similar characters of reference indicate corresponding parts throughout, Figure 1 is a view in perspective, showing my improved device in operation on a body of butter; and Fig. 2 is a transverse section taken on line 2 2 of Fig. 1.

In carrying out my invention I provide a suitable frame A, conveniently consisting of opposite members 1, suitably spaced apart to freely embrace the body of butter to be operated upon, and cross-pieces 2 and 3 connected therewith, the piece 2 being at one end of the frame and piece 3 lying intermediate the ends thereof. Adjacent the opposite end of the frame from piece 2 is a cutter 4, conveniently consisting of a section of wire which is attached at one end to one of the members 1 and connected at the opposite end with a tension device, as 5, mounted on the other of said members.

Reference-numeral 6 designates a second cutter conveniently consisting of one edge portion of a broad thin plate 6', which extends across frame A with said edge presented to cutter 4 and having its end portions slidably engaged in opposite slots 1', formed in the forward end portions of members 1, so that said plate may be moved to and from cutter 4.

Connected with plate 6' is a suitable handle in the form of a stem 7, which extends rearwardly therefrom and is slidably engaged in suitable apertures formed in the cross-pieces 2 and 3. This stem projects outwardly from piece 2 and is provided at its outer end with a knob 7'.

Mounted on frame A are devices, as 8 and 9 9, which are adapted for engagement with the body of butter to be operated upon and serve for both guiding and gaging when manipulating the implement to make cuts in said body.

As will be observed upon reference to the drawings, the device 8 is at one side of frame A and lies over the space between the forward portions of members 1, while the devices 9 have projection from the opposite side of said frame and lie at an angle to device 8, the cutter 4 being intermediate the planes in which the device 8 and the devices 9 9, respectively, lie.

In the preferred construction the device 8 is formed with opposite flat fingers 8', which are connected with one end of a stem 10, having its opposite end portion bent toward frame A at right angles to said fingers and slidably engaged in a suitable aperture formed in cross-piece 3, whereby the fingers 8' can be adjusted toward and from said frame.

The devices 9 are similar in form to fingers 8' and are each provided with a stem portion 9', disposed at an angle to the device and movably mounted on cross-piece 3, so that the devices can be adjusted toward and from cutter 4.

To secure the devices 8 and 9 9 in their adjusted positions, I employ set-screws, as 12, one for each device, which have screw-threaded engagement in suitable apertures provided in cross-piece 3, so that the screws may be set up to impinge the stems of the respective devices to which they pertain.

An operation of the implement to cut and remove from a body of butter, as B, a portion thereof of predetermined size would be as follows: The fingers 8' 8' and the devices 9 9 are adjusted relatively to cutter 4 in conformity with the thickness and width, respectively, of the portion of the body of butter it is desired to remove. The implement is then applied to the body of butter, with the cutter 4 extending across the upper surface and the devices 9 resting against one end surface of said body. The said cutter is then forced downwardly into the butter by the operator pressing upon the members 1 until the fingers 8' are brought into engagement with the upper surface of the body of butter, (see Fig. 1,) the device 9 9 during this movement sliding upon the end surface of said body and serving to guide the implement in making the vertical cut. A second cut is now made in the body of butter by pressing upon knob 7' to force cutter 6 into the butter, as indicated by broken lines in Fig. 1, until it reaches cutter 4, when the portion of butter thus severed can be removed by lifting the implement, as said portion will rest upon plate 6' with the fingers 8' engaging its upper surface. The severed portion of butter being thus held in the implement it can be readily transferred to a sheet of wrapping-paper by placing the implement over the sheet and withdrawing plate 6' from beneath the butter.

The cutter 4 may be operated instead of cutter 6 to make the second or horizontal cut by drawing outwardly on frame A, the fingers 8' during this operation sliding along the top surface of the butter, and thereby serving to guide the implement.

If desired to cut entirely through a comparatively thick body of butter at one operation, the device 8 can be adjusted in conformity with the depth of the cut to be made or entirely removed, as preferred, and the implement applied, as heretofore described, for making the vertical cut. When the cutter has been passed entirely through the body of butter, the plate 6' can be moved beneath the portion severed to support the same on the frame for transfer.

Having thus described my invention, what I claim as new, and desire to secure by Letters Patent of the United States of America, is—

1. An implement for cutting butter comprising a frame including members spaced apart to embrace freely the body of butter to be operated upon, means disposed over the space between said members and secured to the frame for engagement with said body to guide the implement in cutting, a second guiding means arranged intermediate said members at an angle to said first guiding means, and cutting means carried by said frame intermediate the planes in which said guiding means respectively lie.

2. An implement for cutting butter comprising a frame including members spaced apart to embrace freely the body of butter to be operated upon, means disposed over the space between said members for engagement with said body to guide the implement in cutting, a second guiding means arranged at an angle to said first guiding means, and cutting means carried by said frame intermediate the planes in which the said guiding means respectively lie, said guiding means being movably secured to said frame for adjustment relatively to said cutting means.

3. An implement for cutting butter comprising a frame including members spaced apart to embrace freely the body of butter to be operated upon, a cutter connected with said members for producing a cut by movement of the frame, means secured to the frame and disposed over the space between said members for engagement with said body to limit the depth of said cut, and a second cutter movable on said frame for producing a second cut intersecting said first cut when said first cutter is in the butter.

4. An implement for cutting butter comprising a frame including members spaced apart to embrace freely the body of butter to be operated upon, a cutter carried by said members for producing a cut by movement of the frame, means secured to said frame for engagement with said body to guide the implement in producing said cut, and a second cutter movable on said frame for producing a second cut intersecting said first cut when said first cutter is in the butter.

5. An implement for cutting butter comprising a frame including members spaced apart to embrace freely the body of butter to be operated upon, a cutter connected with said members for producing a cut by movement of the frame, means arranged on said frame and moving therewith for engagement with said body to guide the implement in producing said cut and to limit its cutting movement, and a second cutter movable on said frame for producing a second cut intersecting said first cut.

6. An implement for cutting and removing from a body of butter portions thereof, said implement comprising a frame, including members spaced apart to embrace freely the body of butter to be operated upon, a cutter connected with said members for producing a cut by movement of the frame, means arranged on said frame and moving therewith for engagement with said body to guide the implement in producing said cut and to limit its cutting movement, a second cutter movable on said frame for producing a second cut intersecting said first cut, and means movable in the plane of cut of said second cutter for engagement with the portion of butter cut to support the same for removal with the frame.

7. An implement for cutting and removing from a body of butter portions thereof, said implement comprising a frame, cutting means carried thereby for severing a portion from said body, and means movable on said frame for engagement with said portion to support the same for removal and for disengagement relatively to said portion to release the same.

8. An implement for cutting and removing from a body of butter portions thereof, said implement comprising a frame including members spaced apart to freely embrace said body, cutting means carried by said members for severing a portion from said body, and means movable on said frame for engagement with said portion to support the same for removal with the frame and for disengagement relatively to said portions to release the same.

9. An implement for cutting and removing from a body of butter portions thereof, said implement comprising a frame including members spaced apart to freely embrace said body, a cutting means connected with said members for movement therewith to produce a cut, a second cutting means movable toward said first means for producing a second cut intersecting said first cut, and means movable relatively with said second cutting means for engagement with the portion of butter cut to support the same for removal with said frame.

Signed at Seattle, Washington, this 18th day of January, 1906.

ARTHUR C. HUMMER.

Witnesses:
FRANK E. ADAMS,
ARLITA ADAMS.